(12) United States Patent
Bender

(10) Patent No.: US 9,276,965 B2
(45) Date of Patent: *Mar. 1, 2016

(54) SYSTEMS AND METHODS OF MAKING A CALL

(71) Applicant: Hipcricket, Inc., Austin, TX (US)

(72) Inventor: Douglas F. Bender, Scotts Valley, CA (US)

(73) Assignee: Hipcricket, Inc., Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/960,163

(22) Filed: Aug. 6, 2013

(65) Prior Publication Data

US 2014/0044122 A1 Feb. 13, 2014

Related U.S. Application Data

(63) Continuation of application No. 12/098,947, filed on Apr. 7, 2008, now Pat. No. 8,504,048.

(60) Provisional application No. 61/014,324, filed on Dec. 17, 2007.

(51) Int. Cl.
*H04L 29/06* (2006.01)
*H04L 12/46* (2006.01)

(52) U.S. Cl.
CPC ........ *H04L 65/1013* (2013.01); *H04L 12/4625* (2013.01)

(58) Field of Classification Search
CPC .................. H04L 12/4625; H04L 65/1013
USPC .................. 455/405, 445; 370/351; 379/142, 379/220.01
See application file for complete search history.

(56) References Cited

U.S. PATENT DOCUMENTS

| | | | |
|---|---|---|---|
| 5,402,481 A | 3/1995 | Waldman | 379/355 |
| 5,809,128 A | 9/1998 | McMullin | 379/215 |
| 5,987,103 A | 11/1999 | Martino | 379/93.17 |
| 6,014,440 A | 1/2000 | Melkild et al. | 379/269 |
| 6,091,732 A | 7/2000 | Alexander, Jr. et al. | 370/401 |
| 6,104,757 A | 8/2000 | Rhee | 375/240 |
| 6,118,768 A | 9/2000 | Bhatia et al. | 370/254 |
| 6,125,113 A | 9/2000 | Farris et al. | 370/389 |
| 6,141,345 A | 10/2000 | Goeddel et al. | 370/389 |
| 6,185,288 B1 | 2/2001 | Wong | 379/219 |
| 6,256,778 B1 | 7/2001 | Oliver | 717/5 |
| 6,307,853 B1 | 10/2001 | Storch et al. | 370/354 |
| 6,324,271 B1 | 11/2001 | Sawyer et al. | 379/142.05 |
| 6,351,464 B1 | 2/2002 | Galvin et al. | 370/356 |
| 6,359,880 B1 | 3/2002 | Curry et al. | 370/352 |

(Continued)

OTHER PUBLICATIONS

Bennet, B., "Memory in a Flash" www.theage.com.au pp. 1-3 (Jan. 31, 2004).

(Continued)

*Primary Examiner* — Kashif Siddiqui

(57) ABSTRACT

Systems and methods of making calls are provided. A particular method includes receiving input indicating a destination address at a mobile communication device. The method also includes determining whether the destination address is of a predetermined type. The method further includes initiating a call to a communication bridge via a mobile communication network when the destination address is of the predetermined type. The method also includes sending an instruction to the communication bridge to initiate a communication connection to the destination address.

20 Claims, 9 Drawing Sheets

(56) References Cited

U.S. PATENT DOCUMENTS

| | | | |
|---|---|---|---|
| 6,389,005 B1 | 5/2002 | Cruickshank | 370/352 |
| 6,418,324 B1 | 7/2002 | Doviak et al. | 455/556 |
| 6,434,139 B1 | 8/2002 | Liu et al. | 370/352 |
| 6,445,694 B1 | 9/2002 | Swartz | 370/352 |
| 6,449,251 B1 | 9/2002 | Awadallah et al. | 370/229 |
| 6,496,477 B1 | 12/2002 | Perkins et al. | 370/228 |
| 6,532,366 B1 | 3/2003 | Chung et al. | 455/445 |
| 6,542,497 B1 | 4/2003 | Curry et al. | 370/352 |
| 6,597,686 B1 | 7/2003 | Smyk | 370/352 |
| 6,603,774 B1 | 8/2003 | Knappe et al. | 370/466 |
| 6,618,761 B2 | 9/2003 | Munger et al. | 709/241 |
| 6,636,504 B1 | 10/2003 | Albers et al. | 370/352 |
| 6,658,496 B1 | 12/2003 | Minakata et al. | 710/5 |
| 6,700,956 B2 | 3/2004 | Chang et al. | 379/93.09 |
| 6,760,324 B1 | 7/2004 | Scott et al. | 370/352 |
| 6,763,226 B1 | 7/2004 | McZeal, Jr. | 455/90.2 |
| 6,771,594 B1 | 8/2004 | Upadrasta | 370/228 |
| 6,788,769 B1 | 9/2004 | Waites | 379/93.24 |
| 6,795,540 B1 | 9/2004 | Mow | 379/188 |
| 6,822,957 B1 | 11/2004 | Schuster et al. | 370/389 |
| 6,826,174 B1 | 11/2004 | Erekson et al. | 370/352 |
| 6,856,612 B1 | 2/2005 | Bjelland et al. | 370/338 |
| 6,857,027 B1 | 2/2005 | Lindeborg et al. | 709/239 |
| 6,895,000 B2 | 5/2005 | Lai et al. | 370/352 |
| 6,907,031 B1 | 6/2005 | Ehlinger et al. | 370/352 |
| 6,947,417 B2 | 9/2005 | Laursen et al. | 370/389 |
| 6,954,454 B1 | 10/2005 | Schuster et al. | 370/352 |
| 6,986,030 B2 | 1/2006 | Shmueli et al. | 713/1 |
| 7,012,888 B2 | 3/2006 | Schoeneberger et al. | 370/217 |
| 7,016,481 B2 | 3/2006 | McElvaney | 379/88.17 |
| 7,023,837 B1 | 4/2006 | Srinivasan | 370/352 |
| 7,046,658 B1 | 5/2006 | Kundaje et al. | 370/352 |
| 7,046,683 B1 | 5/2006 | Zhao | 370/401 |
| 7,092,380 B1 | 8/2006 | Chen et al. | 370/352 |
| 7,113,500 B1 | 9/2006 | Bollinger et al. | 370/352 |
| 7,145,900 B2 | 12/2006 | Nix et al. | 370/352 |
| 7,162,549 B2 | 1/2007 | Mambakkam et al. | 710/16 |
| 7,212,622 B2 | 5/2007 | Delaney et al. | 379/221.02 |
| 7,213,766 B2 | 5/2007 | Ryan et al. | 235/492 |
| 7,283,542 B2 | 10/2007 | Mitchell | 370/401 |
| 7,302,053 B2 | 11/2007 | Chang et al. | 379/220.01 |
| 7,307,982 B2 | 12/2007 | Burritt et al. | 370/352 |
| 7,325,133 B2 | 1/2008 | Fascenda | 713/168 |
| 7,336,654 B2 | 2/2008 | Barkley et al. | 370/352 |
| 7,570,630 B1 | 8/2009 | Phillips et al. | 370/352 |
| 8,504,048 B2 * | 8/2013 | Bender | 455/445 |
| 2001/0038033 A1 | 11/2001 | Habib | 235/375 |
| 2002/0007273 A1 | 1/2002 | Chen | 704/229 |
| 2002/0052965 A1 | 5/2002 | Dowling | 709/230 |
| 2002/0097843 A1 | 7/2002 | Krol et al. | 379/88.01 |
| 2002/0131604 A1 | 9/2002 | Amine | 381/58 |
| 2002/0184376 A1 | 12/2002 | Sternagle | 709/230 |
| 2002/0191621 A1 | 12/2002 | Jha | 370/401 |
| 2002/0191768 A1 | 12/2002 | Stoughton | 379/219 |
| 2003/0002479 A1 | 1/2003 | Vortman et al. | 370/352 |
| 2003/0012137 A1 | 1/2003 | Abdelilah | 370/229 |
| 2003/0023669 A1 | 1/2003 | DeLima et al. | 709/203 |
| 2003/0110257 A1 | 6/2003 | Hyun et al. | 709/224 |
| 2003/0112820 A1 | 6/2003 | Beach | 370/465 |
| 2003/0123388 A1 | 7/2003 | Bradd | 370/230 |
| 2003/0161453 A1 | 8/2003 | Veschi | 379/93.05 |
| 2003/0204619 A1 | 10/2003 | Bays | 709/238 |
| 2003/0214939 A1 | 11/2003 | Eldumiati et al. | 370/352 |
| 2003/0219006 A1 | 11/2003 | Har | 370/352 |
| 2003/0224780 A1 | 12/2003 | Rodman et al. | 455/426.1 |
| 2004/0019539 A1 | 1/2004 | Raman et al. | 705/29 |
| 2004/0032860 A1 | 2/2004 | Mundra et al. | 370/352 |
| 2004/0047451 A1 | 3/2004 | Barker et al. | 379/67.1 |
| 2004/0086093 A1 | 5/2004 | Schranz | 379/37 |
| 2004/0114581 A1 | 6/2004 | Hans et al. | 370/356 |
| 2004/0133668 A1 | 7/2004 | Nicholas, III | 709/223 |
| 2004/0141508 A1 | 7/2004 | Schoeneberger et al. | 370/401 |
| 2004/0141758 A1 | 7/2004 | El-Reedy | 398/167.5 |
| 2004/0205023 A1 | 10/2004 | Hafer et al. | 705/43 |
| 2004/0205777 A1 | 10/2004 | Zalenski et al. | 719/320 |
| 2004/0218583 A1 | 11/2004 | Adan et al. | 370/352 |
| 2004/0223458 A1 | 11/2004 | Gentle | 370/230 |
| 2004/0240430 A1 | 12/2004 | Lin et al. | 370/352 |
| 2004/0248590 A1 | 12/2004 | Chan et al. | 455/456.3 |
| 2004/0258003 A1 | 12/2004 | Kokot et al. | 370/254 |
| 2005/0002506 A1 | 1/2005 | Bender et al. | 379/142.01 |
| 2005/0074031 A1 | 4/2005 | Sunstrum | 370/493 |
| 2005/0089052 A1 | 4/2005 | Chen et al. | 370/401 |
| 2005/0091392 A1 | 4/2005 | Gesswein et al. | 709/231 |
| 2005/0094621 A1 | 5/2005 | Acharya et al. | 370/352 |
| 2005/0138183 A1 | 6/2005 | O'Rourke et al. | 709/228 |
| 2005/0180464 A1 | 8/2005 | McConnell et al. | 370/494 |
| 2005/0195799 A1 | 9/2005 | Burne et al. | 370/352 |
| 2005/0201414 A1 | 9/2005 | Awais | 370/468 |
| 2005/0220083 A1 | 10/2005 | Takeuchi | 370/352 |
| 2005/0243733 A1 | 11/2005 | Crawford et al. | 370/252 |
| 2005/0276409 A1 | 12/2005 | Goldman et al. | 379/220.01 |
| 2005/0286498 A1 | 12/2005 | Rand et al. | 370/352 |
| 2006/0008059 A1 | 1/2006 | Ying et al. | 379/88.17 |
| 2006/0029062 A1 | 2/2006 | Rao et al. | 370/389 |
| 2006/0029063 A1 | 2/2006 | Rao et al. | 370/389 |
| 2006/0031393 A1 | 2/2006 | Cooney et al. | 709/217 |
| 2006/0034296 A1 | 2/2006 | Talucci | 370/395.52 |
| 2006/0037071 A1 | 2/2006 | Rao et al. | 726/13 |
| 2006/0039356 A1 | 2/2006 | Rao et al. | 370/352 |
| 2006/0040641 A1 | 2/2006 | Dawson et al. | 455/405 |
| 2006/0208066 A1 | 9/2006 | Finn et al. | 235/380 |
| 2006/0276230 A1 | 12/2006 | McConnell | 455/563 |
| 2007/0171898 A1 | 7/2007 | Salva | 370/356 |
| 2007/0248081 A1 | 10/2007 | Barkley et al. | 370/352 |
| 2008/0025291 A1 | 1/2008 | Barkley et al. | 370/352 |

OTHER PUBLICATIONS

"Brief Introduction to QiiQ Communications Inc. and Ecocarrier Inc." www.qiiq.com pp. 1-7 (printed Jun. 10, 2005 and Jul. 17, 2007).
Camarillo, G., et al., "Integration of Resource Management and Session Initiation Protocol (SIP)" *RFC 3312* pp. 1-30 (Oct. 2002).
"CommGenie VoIP Suite" www.nexge.com pp. 1-3 (printed Jun. 1, 2005).
EcoCarrier, "EcoFone" www.ecocarrier.com pp. 1-3 (printed Jun. 13, 2005).
"EcoFone + VoIPPhone Q-FONE-USB" pp. 1-3 (printed Jun. 10, 2005).
"Pocki Phone—VoIP Softphone + USB Flash Disk Drive (128M)" www.welltech.com pp. 1-2 (printed Oct. 5, 2004).
"Pre-paid Call Credits—Adding Extra Call Credits" www.2hands.com.au, pp. 1-2 (printed Jun. 1, 2005).
Rosenberg, J., et al, "SIP: Session Initiation Protocol" *RFC 3261* pp. 1-18 (Jun. 2002).
Rosenberg, J., et al, "STUN—Simple Traversal of User Datagram Protocol (UDP) Through Network Address Translators (NATs)" *RFC 3489* pp. 1-47 (Mar. 2003).
Schulzrinne, H., "Dynamic Host Configuration Protocol (DHCP-for-IPv4) Option for Session Inititation Protocol (SIP) Servers" *RFC 3361* pp. 1-7 (Aug. 2002).
"SIPphoneCasting. Inspired by: Skype Podcast Recorder = SkypeCasters" www.linuxathome.com pp. 1-4 (Dec. 29, 2004).
Tittle, E., "Cool Tools: USB Desktop Peipherals and Devices" www.certmag.com pp. 1-3 (Jun. 2005, accessed Jul. 16, 2009).
Tittle, E., "Cool Tools: USB Desktop Peipherals and Devices" www.certmag.com pp. 1-7 (Jun. 2005, accessed Jul. 20, 2007).
Trembley, J., "VoIP makes real-time billing a necessity" *Billing Plus* 6(17): 13 (Oct. 4, 2004).
"Web Based VoIP Billing, VoIP Routing, and VoIP Management Software" www.webvoip.com pp. 1-2 (printed Jun. 1, 2005).
Notice of Allowance dated Apr. 3, 2013, mailed in U.S. Appl. No. 12/098,947, pp. 1-22.
Request for Continued Examination (RCE) and RCE Submission as filed in U.S. Appl. No. 12/098,947 on May 4, 2011, pp. 1-14.
Final Office Action dated Feb. 17, 2011, mailed in U.S. Appl. No. 12/098,947, pp. 1-14.
Response to Non-Final Office Action dated Nov. 15, 2010, as filed in U.S. Appl. No. 12/098,947 on Jan. 5, 2011, pp. 1-9.
Examiner Interview Summary dated Dec. 29, 2010, mailed in U.S. Appl. No. 12/098,947, pp. 1-3.
Non-Final Office Action dated Nov. 15, 2010, mailed in U.S. Appl. No. 12/098,947, pp. 1-31.

* cited by examiner

SYSTEMS AND METHODS OF MAKING A CALL

CROSS-REFERENCE TO RELATED APPLICATIONS

The present applications claims priority from and is a continuation of U.S. patent application Ser. No. 12/098,947, filed Apr. 7, 2008, which claims priority from U.S. Provisional Patent Application No. 61/014,324, filed on Dec. 17, 2007, which all are incorporated herein by reference in their entireties.

BACKGROUND

The present disclosure is generally related to a making a call.

Some individuals and businesses find that mobile communications devices provide desirable features, such as the ability to communicate during travel or when away from access to landline communications. Additionally, some calls made via mobile communication devices can be cheaper or more convenient than calls made via a landline telephone. However, some calls made using a mobile communication device can be more expensive than calls made via a landline and may have more limited features. Hence, there is a need for improved systems and methods of making calls.

SUMMARY OF THE INVENTION

Provided herein are systems and methods of making calls.

The methods, systems, and apparatuses are set forth in part in the description which follows, and in part will be obvious from the description, or can be learned by practice of the methods, apparatuses, and systems. The advantages of the methods, apparatuses, and systems will be realized and attained by means of the elements and combinations particularly pointed out in the appended claims. It is to be understood that both the foregoing general description and the following detailed description are exemplary and explanatory only and are not restrictive of the methods, apparatuses, and systems, as claimed.

BRIEF DESCRIPTION OF THE DRAWINGS

In the accompanying figures, like elements are identified by like reference numerals among the several preferred embodiments of the present invention.

DETAILED DESCRIPTION OF THE INVENTION

Figure 1:
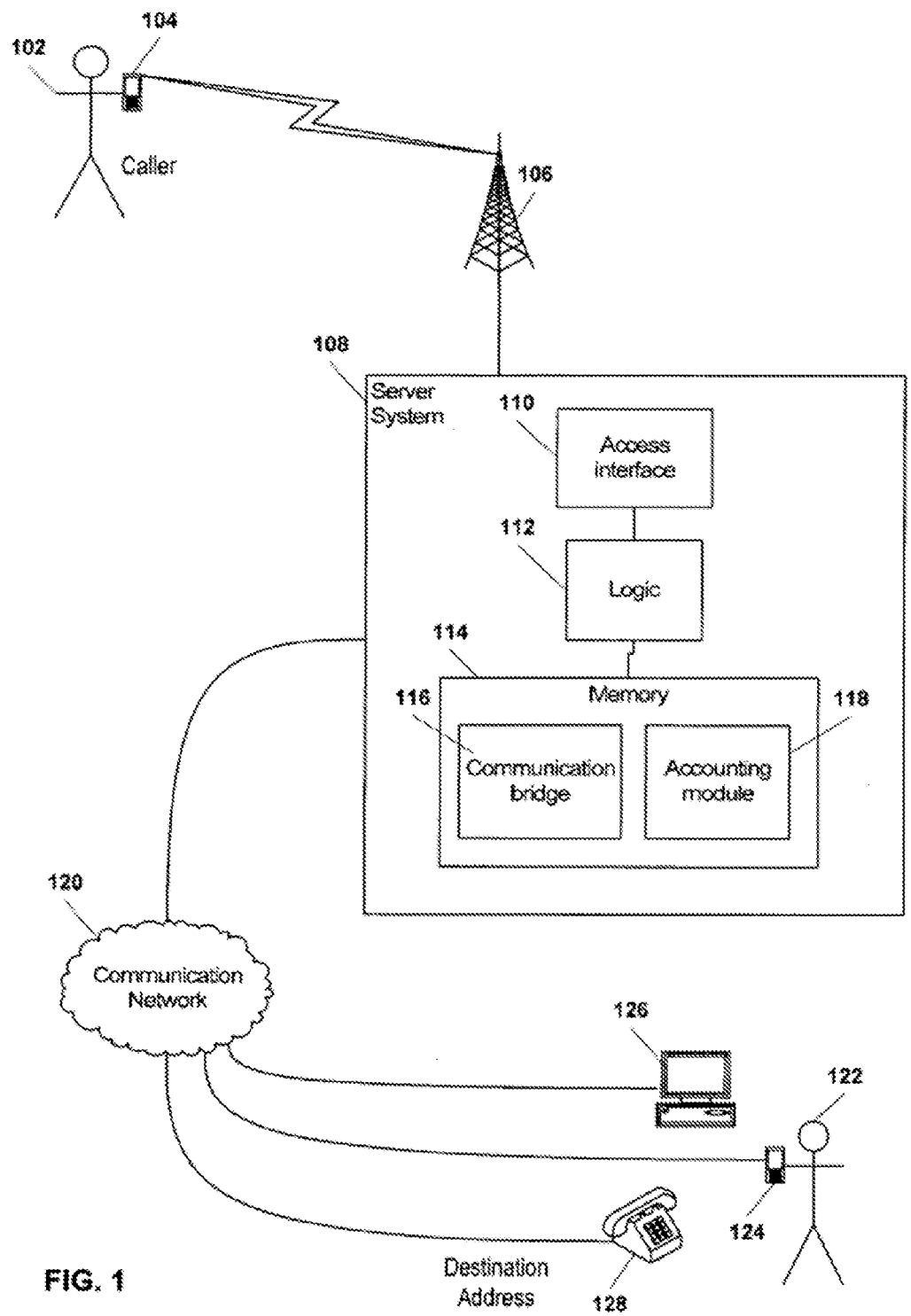
FIG. 1 is a diagram of a first embodiment of a system to make a call.

The foregoing and other features and advantages of the invention are apparent from the following detailed description of exemplary embodiments, read in conjunction with the accompanying drawings. The detailed description and drawings are merely illustrative of the invention rather than limiting, the scope of the invention being defined by the appended claims and equivalents thereof.

A system to make a call is disclosed. The system includes an access interface to receive a voice call to a telephony address associated with the access interface. The call is initiated by a mobile communication device in response to an automatic determination at the mobile communication device to route the call via the access interface based on a destination communication address received at the mobile communication device. The system also includes a communication bridge to initiate a communication to the destination communication address and to convert the voice call to an alternate communication protocol for communication to the destination communication address.

In another particular embodiment, a processor-readable medium includes instructions that, when executed by a processor, cause the processor to receive input indicating a destination address. The processor-readable medium also includes instructions that, when executed by the processor, cause the processor to determine whether the destination address is of a predetermined type. The processor-readable medium also includes instructions that, when executed by the processor, cause the processor to initiate a call to a communication bridge via a mobile communication network when the destination address is of the predetermined type. The processor-readable medium further includes instructions that, when executed by the processor, cause the processor to send an instruction to the communication bridge to initiate a communication connection to the destination address.

In another particular embodiment, a mobile communication device includes an input device to receive input indicating a destination communication address. The mobile communication device also includes an address analysis module to determine whether the destination communication address is of a predetermined type. The mobile communication device also includes a call module to initiate a call to a communication bridge when the destination communication address is of the predetermined type and to send an instruction to the communication bridge to initiate a communication connection to the destination communication address.

In another particular embodiment, a method of making a call is disclosed. The method includes receiving input indicating a destination address at a mobile communication device. The method also includes determining whether the destination address is of a predetermined type. The method further includes initiating a call to a communication bridge via a mobile communication network when the destination address is of the predetermined type. The method also includes sending an instruction to the communication bridge to initiate a communication connection to the destination address.

FIG. 1 illustrates a first embodiment of a system to make a call. The system is designated generally 100. The system 100 includes a user 102 having a mobile communication device 104. The mobile communication device 104 is adapted to communicate via wireless communication system 106. The wireless communication system 106 can communicate with a server system 108. While a single server system 108 is illustrated, the term "system" includes any collection of systems or sub-systems that individually or jointly execute a set, or multiple sets, of instructions to perform one or more of the functions described herein. The server system 108 can bridge communications between the wireless communication system 106 and a communication network 120. The communication network 120 enables Internet Protocol (IP) communication with a user device, such as computer 126, wireless communication device 124 or wired communication device 128 associated with a second user 122. The communication network 120 can also include one or more additional bridge systems to convert data received from the mobile communication device 104 to another communication protocol, such as IP communication and to transmit the communication over a communication network, such as a Public Switched Telephone Network (PSTN).

The server system 108 includes an access interface 110 to facilitate communication with the wireless communication system 106. The access interface 110 is adapted to receive a call to a communication address associated with the access interface 110. For example, the call can be initiated by the mobile communication device 104 in response to an automatic determination at the mobile communication device 104 to route the call via the access interface 110. To illustrate, the mobile communication device 104 may automatically determine to route a call as a Voice over Internet Protocol (VoIP) call based on an evaluation of a destination address received at the mobile communication device.

The server system 108 also includes logic 112 and memory 114 accessible to the logic 112. The memory 114 includes a plurality of modules 116-118 that are executable by the logic 112 to implement various functions of the server system 108. The modules 116-118 can be implemented in hardware, software or any combination thereof.

In a particular embodiment, the memory 114 can include a communication bridge 116, such as a VoIP telephony bridge. The VoIP telephony bridge 116 can be executed by the logic 112 to receive a call via the mobile communication system 106 and to communicate with a second device, such as a user device associated with the second user 122, based on the call. For example, where the communication bridge 116 includes a VoIP telephony bridge, the VoIP telephony bridge is adapted to receive a destination communication address from the module communication device 104, to initiate a call to the destination communication address and to convert voice call data received from the mobile communication device 104 to a VoIP call for transmission to the destination communication address. For example, the VoIP telephony bridge may convert signals received from the mobile communication device 104 in a mobile telephony protocol into VoIP signals for transmission to the destination communication address, and convert VoIP signals received from the destination communication address to mobile telephony protocol signals for transmission to the mobile communication device 104. In a particular embodiment, the communication bridge 116 may be adapted to facilitate non-voice data communications between the mobile communication device 104 and a device associated with the destination address (e.g., the computer 126, the wireless communication device 124, the wired communication device 128, or another communication device). For example, after the communication bridge 116 has established a communication link between the mobile communication device and a second device (i.e., a device associated with the destination address), the mobile communication device 104 may access data stored at the second device, the second device can send data to the mobile communication device, or both. The data can include voice or non-voice data. For example, the data can include multimedia data, text data, graphics data, and so forth. To illustrate a few non-limiting examples, the data can include contact list information, photographs, videos, executable program applications, web pages, or any other type of information.

The memory can also include an accounting module 118. The accounting module 118 can authenticate the mobile communication device 104 based on authentication information received from the mobile communication device 104. For example, the mobile communication device 104 can send authentication information validating that the mobile communication device 104 is authorized to send calls via the server system 108 using the communication bridge 116. In a particular embodiment, a user access telephone number can be associated with a user account record accessible to the accounting module 118. When a call is received at the server system 108 via the user access telephone number, the accounting module 118 can compare caller identification information associated with the call to an authorized telephone record of the user account record. If the caller identification information is associated with an authorized telephone that is related to the user access telephone number, the call is authenticated and the communication bridge 116 is invoked to bridge the call to the destination communication address.

Figure 2:
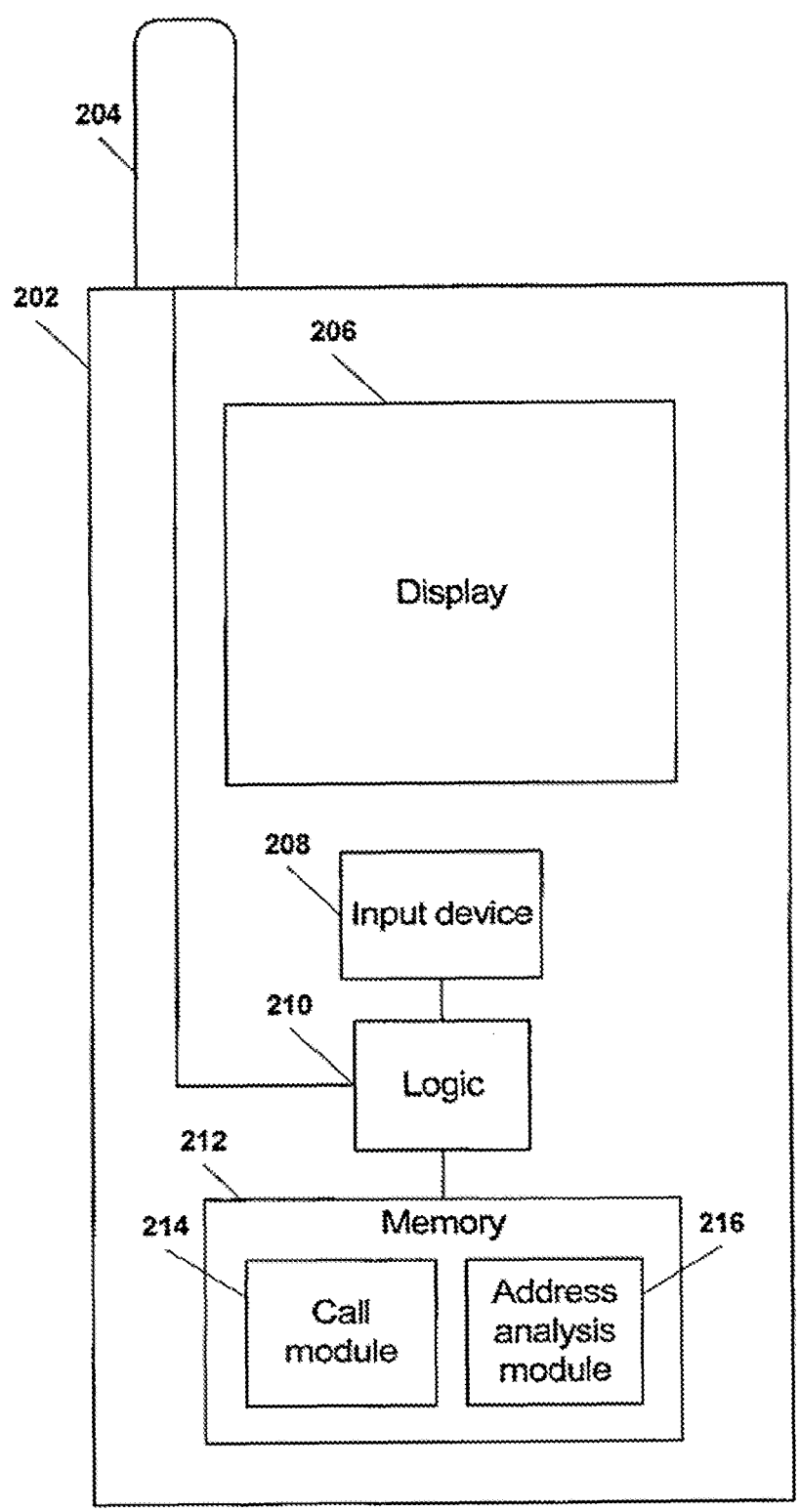
FIG. 2 is a diagram of a second embodiment of a system to make a call.

FIG. 2 illustrates a second particular embodiment of a system to make a call. The system includes a mobile communication device 202. The mobile communication device 202 includes an antenna 204 adapted to send and receive wireless communications signals using a wireless communication protocol. The mobile communication device 202 also includes a display 206, and an input device 208. The input device 208 is adapted to receive input indicating a destination communication address, such as a telephone number, a Short Messaging Service (SMS) address, a web site address, etc. The input device can include a microphone, a keypad, a touch screen, one or more soft buttons, other input devices, or any combination thereof.

The mobile communication device 202 also includes logic 210 and memory 212 accessible to the logic 210. In a particular embodiment, mobile communication device 202 includes a computer-readable medium in which one or more sets of instructions, e.g. software, can be embedded. The instructions may embody one or more of the methods or logic as described herein. In a particular embodiment, the instructions may reside completely, or at least partially, within the memory 212, another memory (not shown), and/or within the logic 210. For example, the memory 212 can include one or more modules adapted to implement various functions of the mobile communication device 202. The modules can be implemented in hardware, software, or any combination thereof. For example, the memory 212 can include one or more software applications which, when executed by the logic 210, implement the functions of the one or more modules. In an alternative embodiment, dedicated hardware implementations, such as application specific integrated circuits, programmable logic arrays and other hardware devices, can be constructed to implement one or more of the methods described herein. Accordingly, the system encompasses software, firmware, and hardware implementations.

The mobile communication device 202 also includes an address analysis module 216. The address analysis module 216 is adapted to determine whether a destination communication address received at the mobile communication address 202 is of a predetermined type. In a particular embodiment, the predetermined type of destination address may be determined based on user configuration settings. For example, the user configurations settings may indicate that the predetermined type of destination address includes international telephony addresses, long distance telephony addresses, local telephony addresses, other telephony addresses, an Internet address, a Universal Resource Identifier (URI) address, an electronic messaging address (e.g., an SMS, Multimedia Messaging service (MMS), or email address), or any combination thereof. In a particular embodiment, the address analysis module 216 analyzes alpha-numerical digits of the destination communication address to determine whether the destination communication address is of the predetermined type. In another particular embodiment, the address analysis module 216 compares the destination communication address to one or more destination communication address patterns. The destination communication address patterns can include features that indicate that a call is of a particular type. For example the destination communication address patterns can identify international calls based on the number of digits in the destination communication address. In another example, the destination communication address patterns can identify long-distance calls based on the presence of an area code or the presence of a particular area code in the destination communication address. In still another example, the destination communication address patterns can identify an electronic messaging address or Internet address based on the presence of a URI scheme (e.g., http, mailto, ftp, etc.), or based on other syntax or semantics indicating that the destination communication address is a URI.

The mobile communication device 202 can also include a call module 214. The call module 214 can be adapted to initiate a call to a communication bridge when the destination communication address is of the predetermined type. The call module 214 can also send an instruction to the communication bridge to initiate or route a communication to the destination communication address. In a particular embodiment, the communication bridge includes a Voice over Internet Protocol (VoIP) telephony bridge, and the call module 214 is also adapted to send voice communication data to the VoIP telephony bridge to be converted to VoIP data for communication to the destination address. For example, the call module 214 can communicate with the VoIP telephony bridge using a wireless communication protocol.

The call module 214 can also be adapted to access non-voice data via the communication bridge. For example, the call module may receive non-voice data from a device associated with the destination address after a communication link to the destination address has been established. The call module 214 may be adapted to receive the data, and store the data in the memory 212 for access by another portion of the mobile communication device 202. For example, the call module 214 may receive image data via the communication bridge and store the image data at the memory 212 where the image data can be accessed by an image viewer element (not shown) of the mobile communication device 202. In another example, the call module 214 may receive contact list data via the communication bridge and store the contact list data at the memory 212 where the contact list data can be accessed by an address book manager element (not shown) of the mobile communication device 202.

Figure 3:
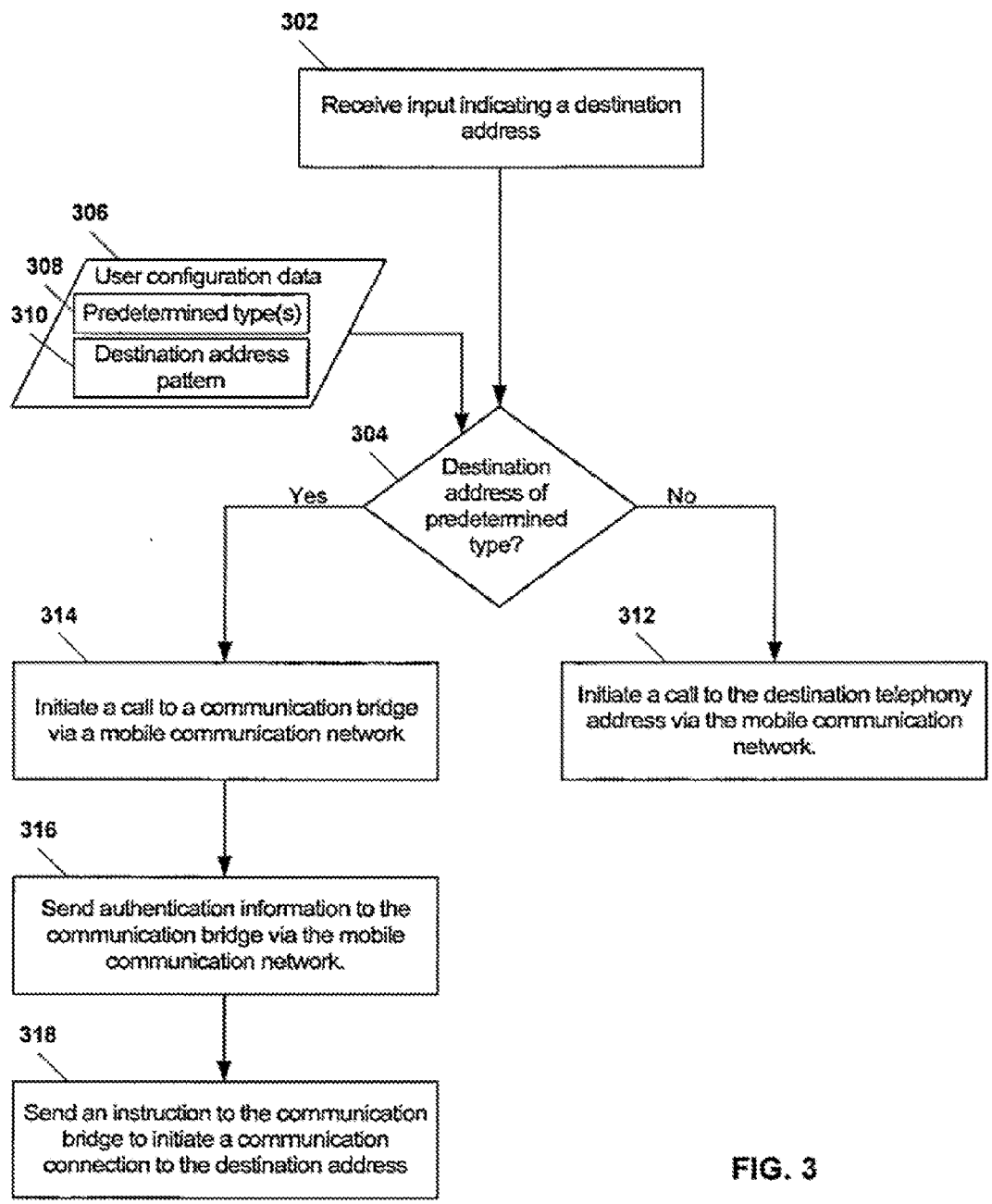
FIG. 3 is a flow chart of a first embodiment of a method of making a call.

FIG. 3 illustrates a first particular embodiment of a method of making a call. The method is designated generally 300. The method 300 includes, at 302, receiving input indicating a destination communication address at a mobile communication device. For example, the input can include a series of digits entered via a keypad of the mobile communication device, input selecting a communication address from a memory (e.g., from a contact list or speed dial list), a voice input, any other input indicating a destination address, or any combination thereof.

The method 300 also includes, at 304, determining whether the destination communication address is of a predetermined type 308. The method 300 can include accessing user configuration data 306 to determine which types of calls are of the predetermined type(s) 308. The user configuration data 306 can include information defining the predetermined type(s) 308 of destination communication addresses. For example, the predetermined types 308 may include international calls, long-distance calls, local calls, other types of telephony calls, a Universal Resource Identifier (URI), a network address, an electronic messaging address, or any combination thereof. In another particular embodiment, the user configuration data 306 can include one or more destination communication address patterns 310. For example, the destination communication address patterns 310 can include information sufficient to identify a particular type of call, such as an international call or long-distance call. To illustrate, the destination communication address patterns can indicate that calls that include an international calling code are of the predetermined type. In another example, the destination communication address patterns can indicate that calls that include particular area codes are of the predetermined type. Whether the destination communication address of a call is of a predetermined type can also be determined by analyzing alpha-numerical digits of the destination communication address.

When the destination communication address is of the predetermined type, the method 300 includes, at 314, initiating a call to a communication bridge via a mobile communication network. The method 300 also includes, at 316, sending authentication information to the communication bridge via the mobile communication network. For example, the authentication information can include caller identification information. In another example, the authentication information can include a key or other authentication data stored in a memory of the mobile communication device. The method further includes, at 318, sending an instruction to the communication bridge to initiate a communication connection to the destination communication address. When the communication connection has been established, the communication bridge may convert communication data received from the mobile communication device in a first communication protocol (e.g., a mobile communication protocol) to a second communication protocol for communication to the destination communication address. Similarly, the communication bridge can convert communication data received from the destination communication address in the second protocol to the first protocol for transmission to the mobile communication device.

When the destination communication address is not of the predetermined type, the method 300 includes, at 312, initiating a call to the destination communication address via the mobile communication network. For example, the call can be connected to the destination communication address via a wireless communication network, a Public Switched Telephone Network (PSTN), or both.

In a particular embodiment, the method 300 allows a call to be placed to any destination communication address as a Voice over Internet Protocol (VoIP) call by routing the call through the communication bridge as a VoIP call. The method 300 does not require that a user dial a telephony address of the communication bridge to initiate a call via the communication bridge. Rather, the method 300 determines whether the call is to a particular type of destination address, and automatically calls the communication bridge when it is. The destination communication address is passed to the communication bridge along with a command to initiate a communication connection to the destination communication address. The method 300 also does not require the user to enter an access code associated with the communication bridge to initiate communication via the communication bridge. Rather, the method 300 can automatically send authentication data from a memory of the mobile communication device to authenticate the mobile communication device to use the communication bridge.

Figure 4:
FIG. 4 is a diagram of a first embodiment of a user interface for making a call.

FIG. 4 illustrates a first embodiment of a user interface for making a call. The user interface is designated generally 400. The user interface 400 includes a user selectable element 402 that allows a user to generate a user account to provide access to a communication bridge. The user interface 400 also includes information about a service providing access to the communication bridge for making calls.

Figure 5:
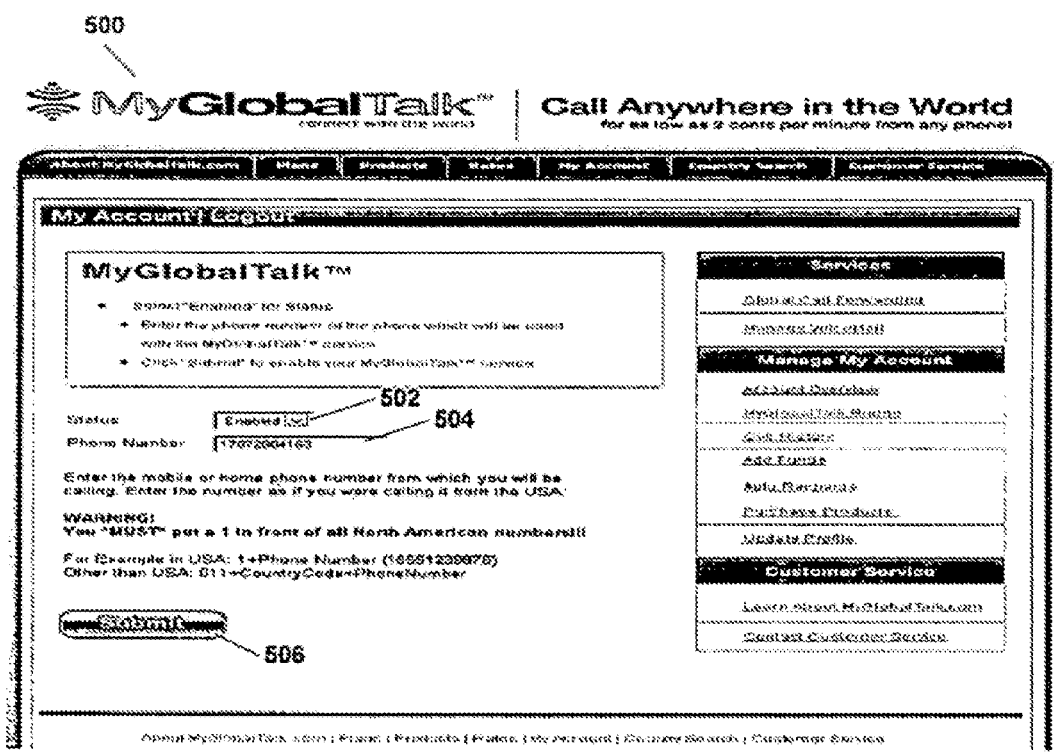
FIG. 5 is a diagram of a second embodiment of a user interface for making a call.

FIG. 5 is a diagram of a second embodiment of a user interface for making a call. The user interface is designated generally 500. The user interface 500 includes a user input element 504 to allow a user to input a telephone number to be associated with a user account that is authorized to communicate via a communication bridge. The telephone number provided can be used to authenticate the telephone by comparing the provided telephone number to caller identification information received when the telephone calls the communication bridge. The user interface 500 also includes a user selectable element 502 that allows the user to enable or disable access to the communication bridge. The user interface 500 also includes a user selectable element 506 to save changes that have been made via the user interface 500.

Figure 6:
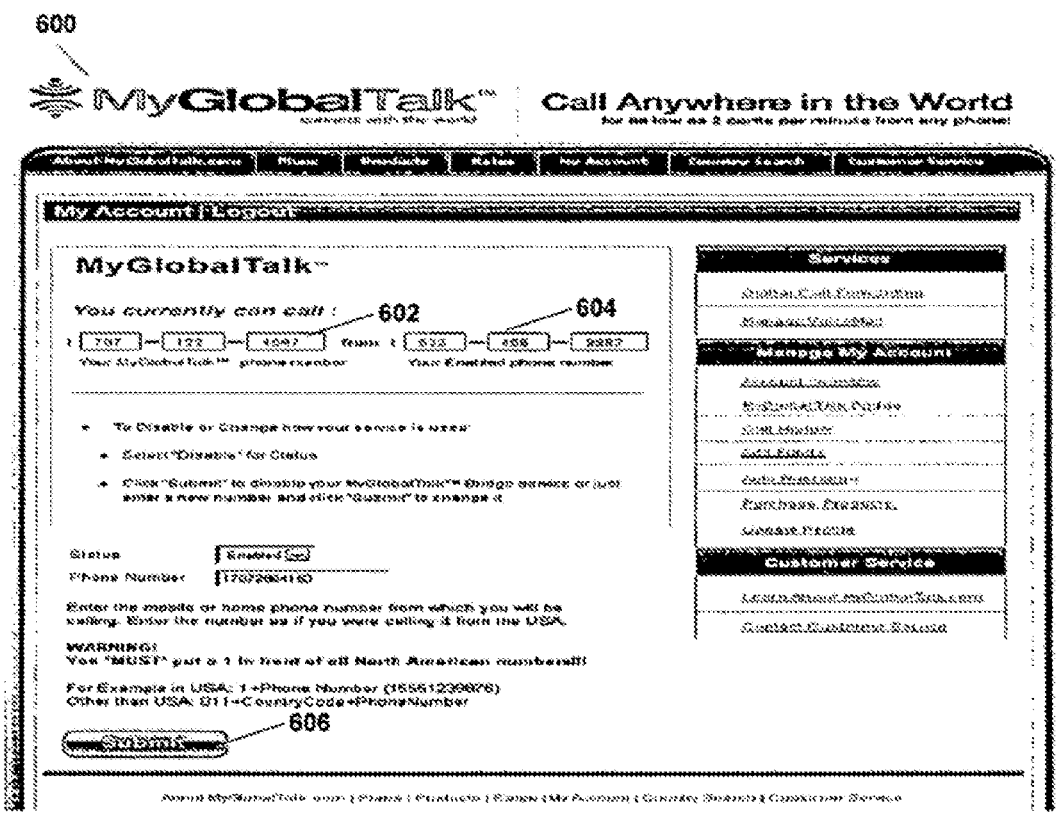
FIG. 6 is a diagram of a third embodiment of a user interface for making a call.

FIG. 6 is a diagram of a third embodiment of a user interface for making a call. The user interface is designated generally 600. The user interface 600 includes user input element(s) 602 to receive input indicating a user access telephone number associated with a communication bridge. The user access telephone number is an access number assigned to the user and associated with user's account. A call placed to the user access telephone number is received by the communication bridge or an associated server system. If the user is authorized to communicate via the communication bridge, the call to the communication bridge can be forwarded to a destination communication address via an appropriate communication protocol.

The user interface 600 also includes user input element(s) 604 to receive a telephone number associated with a telephone authorized to access the communication bridge. The telephone number associated with the authorized telephone can be used by the communication bridge or the associated server system to authenticate that a particular telephone is authorized to communicate via the communication bridge. The telephone number associated with the authorized telephone can also be used by the communication bridge or the associated server system to relate a call to a customer account for billing purposes. The user interface 600 also includes a user selectable element 606 that allows the user to save changes made via the user interface 600. For example, when the user selectable element 606 is selected, changes made via the user interface 600 can be used to update a customer account record.

A particular embodiment is illustrated by the MyGlobalTalk service available from i2 Telecom International, Inc. MyGlobalTalk places Internet telephony in the hands of cell phone users, independent of wireless carrier technology, handset manufacturer, or the type of wireless carrier voice/data plan involved. In addition, MyGlobalTalk is fully functional without local access to the Internet or proximity to an Internet "hotspot". Users also need not wait for the availability of a dual-mode WiFi phone, because MyGlobalTalk provides the benefits of a dual-mode phone at a fraction of the cost using the customer's existing mobile handset.

MyGlobalTalk is compatible with SmartPhone handsets and with other application enabled handsets, such as Java-enabled handsets, standard landline phones, and other communication devices. The MyGlobalTalk service includes a MyGlobalTalk mobile application and a MyGlobalTalk branded web site, an exemplary embodiment of which is illustrated in FIGS. 4-6. The MyGlobalTalk service enables mobile users to access the Internet (e.g., for Internet telephony communications, electronic messaging, or web site access) in an "untethered" manner via their MyGlobalTalk enabled phone.

With MyGlobalTalk, users need not change their traditional dialing procedures—just enter a destination communication address (e.g., dial the destination phone number) and the system automatically utilizes the MyGlobalTalk communication bridge when appropriate. For example, cell phone users can use their cell phones for VoIP calling, without dialing access codes or making other changes to their normal dialing procedure. Additionally, users can designate when calls should be placed as VoIP calls. This allows the same handset to automatically place some calls as regular telephone calls and some as VoIP calls based on user specified settings.

To initially access the MyGlobalTalk service, users send a message, such as an SMS message, using a designated Common Short Code with an associated keyword. The user then receives a message that includes a link for downloading the MyGlobalTalk mobile application or widget. The user then clicks on the link and the application is downloaded to his/her mobile handset. Once the application has been downloaded, the user launches it for subsequent installation and setup. When prompted by an install script, the user enters a phone number that was selected at the time the user signed up for the MyGlobalTalk service (e.g., a user access telephone number). Also during the installation and setup, the user can "ENABLE" the application. (It is worth noting that analysis, to date, indicates that only minimal battery drain is experienced while the MyGlobalTalk application is ENABLED). Once these steps are complete, the user is finished with the setup phase, and the user can begin using the MyGlobalTalk service.

Users can seamlessly dial international long distance calls without needing to enter any extra digits—just dial as one would normally dial an international number on a land-line phone.

Other options can be available to the user as well, such as:
1) Selectively using MyGlobalTalk for: [0042] i. International calling [0043] ii. Domestic calling [0044] iii. Domestic long-distance calling [0045] iv. International & Domestic calling v. All Calling [0047] vi. Internet browsing and access [0048] vii. Electronic messaging viii. Other communications or combinations of the above;
2) MyGlobalTalk presence to detect a user's availability via the service;
3) MyGlobalTalk buddy lists;
4) MyGlobalTalk friends and family for account sharing;
5) MyGlobalTalk Party Line for conference calling;
6) MyGlobalTalk hide-n-seek for in-bound communications parsing or screening;
7) MyGlobalTalk neighborhood dialing for no cost communications when dialing from one MyGlobalTalk number to another MyGlobalTalk number;
8) MyGlobalTalk speed dials to input particular predefined communication address with a single click; and 9) MyGlobalTalk v-bridge to direct dial VoIP users associated with other VoIP service providers, e.g., Skype, or GoogleTalk.

10) MyGlobalTalk Real-Time for real-time or prompt feedback to user regarding the cost of a communication in progress or just completed One feature of MyGlobalTalk relates to how the service takes advantage of the particular services offered by certain wireless carriers. While MyGlobalTalk offers customers significant cost savings and is very easy to use, there are a number of carriers with certain branded features that, when coupled with MyGlobalTalk, can substantially reduce the cost of these cellular plans. For example, many wireless carriers allow free calls to be made to certain preselected telephone numbers. Examples includes T-Mobile's "myFaves" service, Sprint's "Sprint-to-Home" service, AllTel's "myCircle" service, and so forth.

A user may designate his or her MyGlobalTalk phone number (e.g., his or her user access number) as a preselected free calling number, e.g., a "home" or "favorite" number. To illustrate, with T-Mobile's myFaves service users can designate up to five (5) "favorite" numbers, with Sprint's Sprint-to-Home service users can designate a single number, or with AllTel's myCircle service users can designate up to ten (10) numbers. In each case, if a MyGlobalTalk user designates his or her MyGlobalTalk phone number as one of the designated numbers, then when the MyGlobalTalk application is enabled and a call is automatically routed to the MyGlobalTalk communication bridge, the call does not subtract minutes from the cell phone calling plan. The savings for business travelers, students, military users, ex-patriates, etc., who need to make frequent international calls, can be very substantial. With MyGlobalTalk, these users can complete these calls from their mobile handsets without being charged per minute fees or using an allocation of free or prepaid minutes. By enabling the MyGlobalTalk feature for all international calls plus domestic calls, or selecting the "All Calls" option, all of the user's calls can be completed without ever touching the user's cellular calling plan minutes. This will allow users to sign up for the minimum-cost plans offered by wireless carriers and yet still be able to make an unlimited number of international and domestic long-distance calls.

MyGlobalTalk is simple to use and, once activated, does not require further adjustments. The Download and Setup process utilizes standard SMS text messaging for acquiring the application and two simple data entry points during installation and setup.

Figure 7:
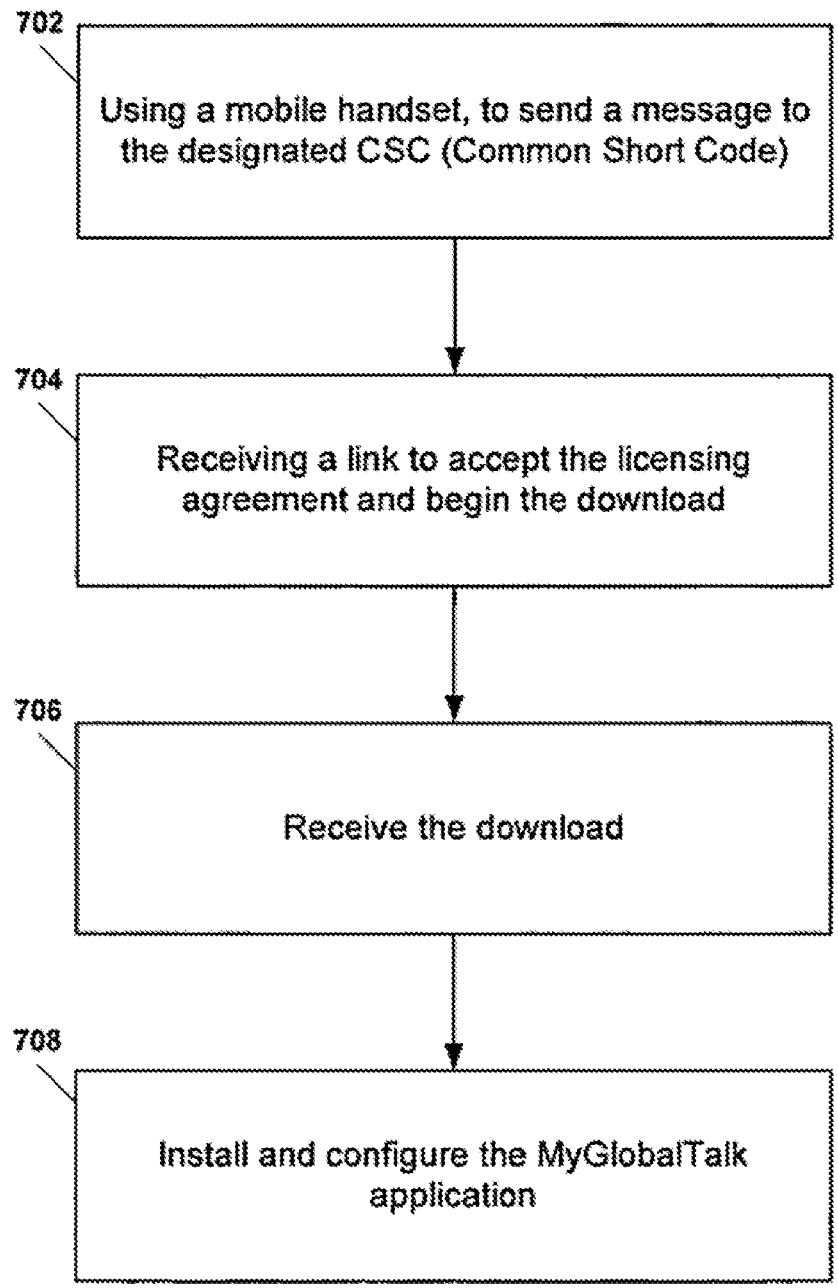
FIG. 7 is a flow chart of a second embodiment of a method of making a call.

FIG. 7 illustrates a particular embodiment of a method of downloading an application to enable a communication device to automatically route telephone calls via a communication bridge, such as the MyGlobalTalk application, the method designated generally 700. The method 700 includes, at 702, using a communication device, such as a mobile handset, to send a message to the designated CSC (Common Short Code). For example, the message may include the keyword "MyGlobalTalk" in the subject line or body of the message. The MyGlobalTalk service system may send a response to the mobile handset. The response can include a link that, when activated, connects the mobile handset to a download server. The method 700 also includes, at 704, receiving the link and selecting the link to accept the licensing agreement and begin the download. The method 700 also includes, at 706, receiving the download. For example, the download can include a MyGlobalTalk application or an installation application or script that installs the MyGlobalTalk application. The method 700 further includes, at 708, installing and configuring the MyGlobalTalk application on the mobile handset.

Figure 8:
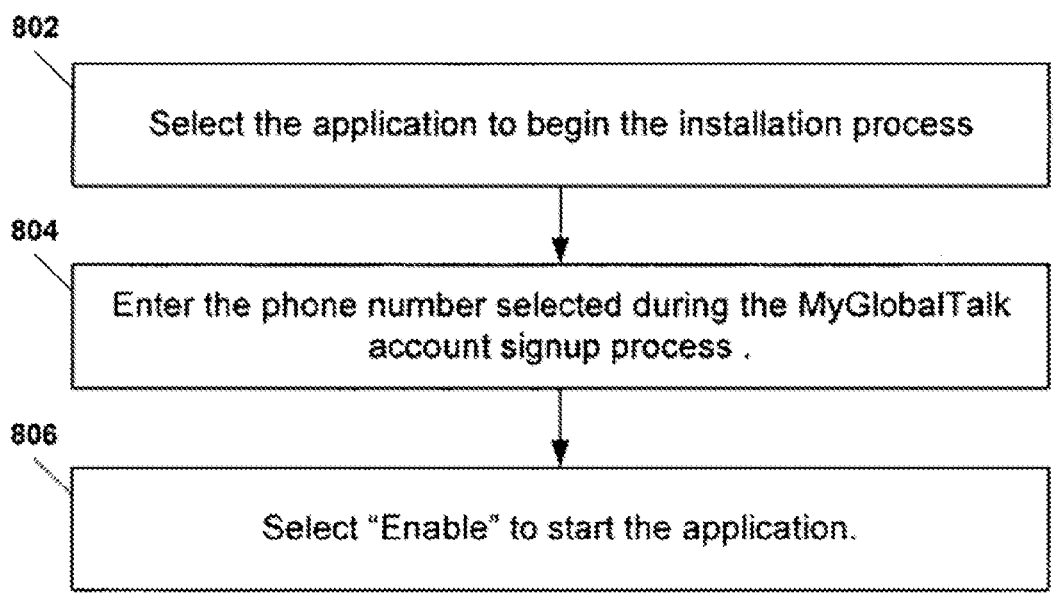
FIG. 8 is a flow chart of a third embodiment of a method of making a call.

FIG. 8 illustrates a particular embodiment of a method of downloading an application to automatically route calls to a communication bridge, such as the MyGlobalTalk application. The method is designated generally 800. The method 800 includes, at 802, selecting the MyGlobalTalk installation application to begin the installation. For example, the user may find the application in a memory of the mobile handset and click (or double-click) on the application to begin the installation process. The method 800 also includes, at 804, entering a phone number that was selected during the MyGlobalTalk account signup process (e.g., a telephone number associated with the mobile handset and/or a user access number). The method 800 also includes, at 806, selecting to enable the MyGlobalTalk application.

Figure 9:
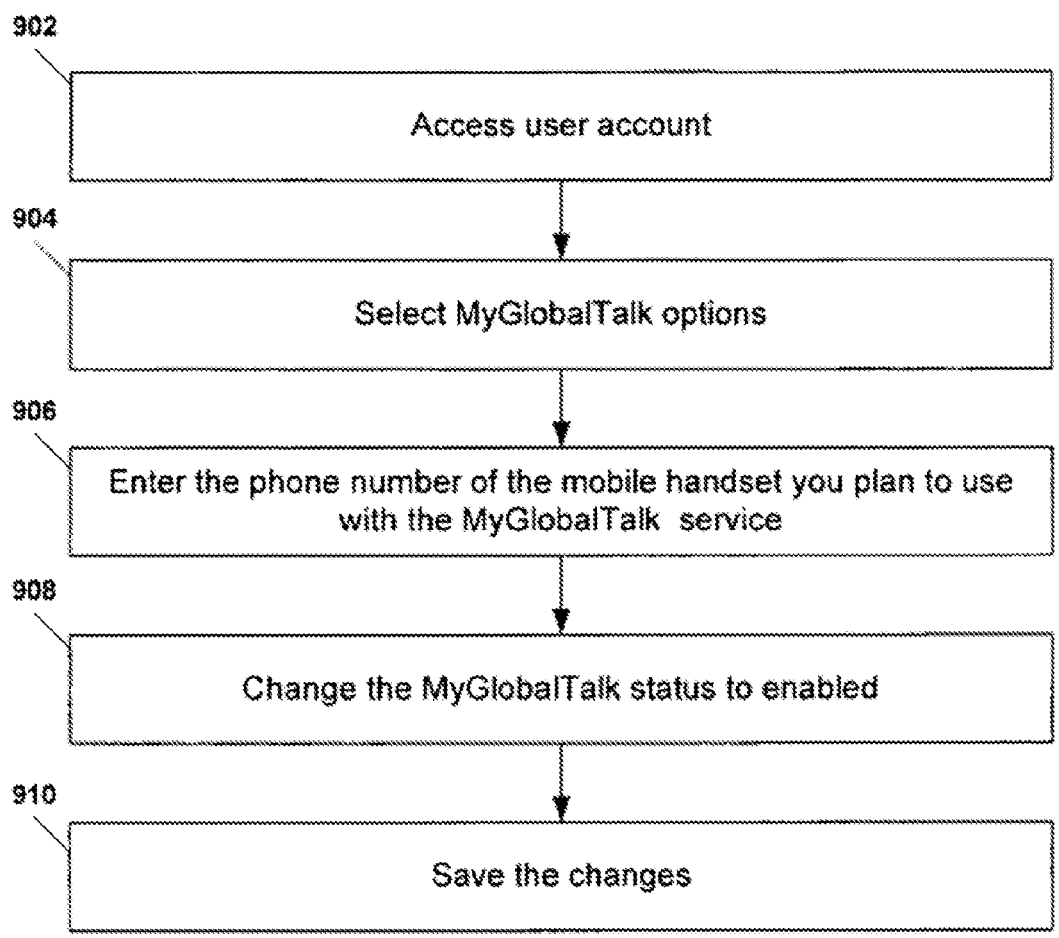
FIG. 9 is a flow chart of a fourth embodiment of a method of making a call.

FIG. 9 illustrates a particular embodiment of a method of setting up a user account to access a communication bridge, such as a MyGlobalTalk account. The method is designated generally 900. The method 900 includes, at 902, accessing a user account associated with the MyGlobalTalk service. For example, the user may log into an online account using a User Name and Password associated with the user's MyGlobalTalk service account. The method 900 also includes, at 904, selecting the MyGlobalTalk account options. The method 900 also includes, at 906, entering the communication address (e.g., a phone number) associated with the mobile handset (or other communication device) a user plans to use with the MyGlobalTalk service. The method 900 further includes, at 908, changing the MyGlobalTalk status to enabled. The method 900 also includes, at 910, saving the changes to the MyGlobalTalk account. For example, the user may select a "submit" option. After the account set up process is complete, the MyGlobalTalk service is ready for use.

To use the MyGlobalTalk service, a user inputs a destination communication address (e.g., dials a telephone number as normal). The MyGlobalTalk application running on the user's mobile handset determines proper call routing based on the set-up options. In addition, MyGlobalTalk permits multiple methods of receiving the destination communication address, including: 1) Keypad, 2) Contacts, and 3) Call History. In each case, the MyGlobalTalk application analyzes the destination communication address and routes the call according to the user's set up parameters. The MyGlobalTalk application also remembers its users, and whenever an update, new feature, or newer version of the application becomes available, the users can receive a notification on their handset with instructions on how to acquire the updates. The MyGlobalTalk mobile application and updates are available to the users, regardless of which mobile communication service provider they use.

The present disclosure contemplates a computer-readable medium that includes instructions or receives and executes instructions responsive to a propagated signal, so that a device connected to a network can communicate voice, video or data over the network. Further, the instructions may be transmitted or received over the network via the network interface device. The term "computer-readable medium" includes a single medium or multiple media, such as a centralized or distributed database, and/or associated caches and servers that store one or more sets of instructions. The term "computer-readable medium" includes any medium that is capable of storing, encoding or otherwise tangibly embodying a set of instructions for execution by a processor or that cause a computer system to perform any one or more of the methods or operations disclosed herein.

In a particular non-limiting, exemplary embodiment, the computer-readable medium can include a solid-state memory such as a memory card, SIM card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although the present specification describes components and functions that may be implemented in particular embodiments with reference to particular standards and protocols, the disclosed embodiments are not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be reduced. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above-disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method comprising:
   receiving, at a mobile communication device, input indicating a first communication address;
   determining whether the first communication address is of a predetermined type; and
   when the first communication address is of the predetermined type, initiating a call, via a mobile communication network, to a second communication address that is different than the first communication address, wherein the second communication address is associated with a communication bridge; and
   sending an instruction to the communication bridge to initiate a communication connection to the first communication address.

2. The method of claim 1, further comprising, when the first communication address is not of the predetermined type, initiating a communication to the first communication address via the mobile communication network.

3. The method of claim 1, further comprising sending authentication information to the communication bridge via the mobile communication network.

4. The method of claim 3, wherein the authentication information comprises caller identification information.

5. The method of claim 3, wherein authentication information is not received from a user at the mobile communication device.

6. The method of claim 1, wherein determining whether the first communication address is of a predetermined type comprises analyzing alpha-numerical digits of the first communication address.

7. The method of claim 1, wherein the predetermined type comprises an international telephony address.

8. The method of claim 1, wherein the predetermined type comprises a long-distance telephony address.

9. The method of claim 1, wherein the predetermined type comprises an internet address.

10. The method of claim 1, wherein determining whether the first communication address is of a predetermined type comprises comparing the first communication address to one or more communication address patterns.

11. The method of claim 1, wherein determining whether the first communication address is of a predetermined type comprises accessing user configuration data to determine the predetermined type.

12. The method of claim 1, wherein a user does not dial the second communication address associated with the communication bridge to initiate the communication to the first communication address.

13. The method of claim 1, wherein a user does not enter an access code associated with the communication bridge to initiate the communication to the destination communication address.

14. A tangible processor-readable medium, comprising:
instructions that, when executed by a processor, cause the processor to receive input indicating a destination address;
instructions that, when executed by the processor, cause the processor to determine whether the destination address is of a predetermined type;
instructions that, when executed by the processor, cause the processor to initiate a call to a second address associated with a communication bridge via a mobile communication network when the destination address is of the predetermined type, wherein the second address is different than the destination address; and
instructions that, when executed by the processor, cause the processor to send an instruction to the communication bridge to initiate a communication to the destination address.

15. The tangible processor-readable medium of claim 14, wherein the instructions are adapted to be executed by a processor of a mobile communication device.

16. The tangible processor-readable medium of claim 14, wherein the communication bridge comprises a Voice over Internet Protocol (VoIP) telephony bridge, and wherein the communication comprises a VoIP call.

17. The tangible processor-readable medium of claim 14, further comprising, instructions that when executed by the processor, cause the processor to receive data from a device associated with the destination address via the communication bridge after communication to the destination address is initiated.

18. The tangible processor-readable medium of claim 14, wherein the data comprises voice data.

19. The tangible processor-readable medium of claim 14, wherein the data comprises non-voice data.

20. A mobile communication device, comprising:
an input device to receive input indicating a destination communication address;
an address analysis module to determine whether the destination communication address is of a predetermined type; and
a call module to initiate a call to a second address associated with a communication bridge when the destination communication address is of the predetermined type and to send an instruction to the communication bridge via the call to initiate a communication connection to the destination communication address, wherein the second address is different than the destination communication address.

* * * * *